United States Patent [19]

Ramsey

[11] Patent Number: 4,819,136
[45] Date of Patent: Apr. 4, 1989

[54] RUNNING BOARD LIGHT ASSEMBLY

[76] Inventor: Edward Ramsey, 22615 S.R. 120, Elkhart, Ind. 46516

[21] Appl. No.: 864,608

[22] Filed: May 16, 1986

[51] Int. Cl.$^4$ ............................................. B60Q 1/24
[52] U.S. Cl. ..................................... 362/81; 362/267; 362/375
[58] Field of Search ....................... 362/61, 81, 83, 76, 362/146, 267, 362, 368, 375; 280/163, 164 R, 414.1

[56] References Cited

U.S. PATENT DOCUMENTS

| | | | |
|---|---|---|---|
| 2,786,935 | 3/1957 | Geary | 362/83 |
| 4,259,710 | 3/1981 | Schlack | 362/267 |
| 4,281,367 | 7/1981 | Moore et al. | 362/267 X |
| 4,380,793 | 4/1983 | Potts | 362/267 |
| 4,617,617 | 10/1986 | Cunningham et al. | 362/267 |
| 4,620,268 | 10/1986 | Ferenc | 362/375 X |

Primary Examiner—Randall L. Green
Attorney, Agent, or Firm—Price, Heneveld, Cooper DeWitt & Litton

[57] ABSTRACT

A running board light assembly which is attached to the underside of a specially desinged automotive running board. For the purpose of providing both functional and decorative lighting. The running board light assembly incorporates features which serve to render the assembly impervious to the several weather—related conditions to which it may be subjected.

8 Claims, 2 Drawing Sheets

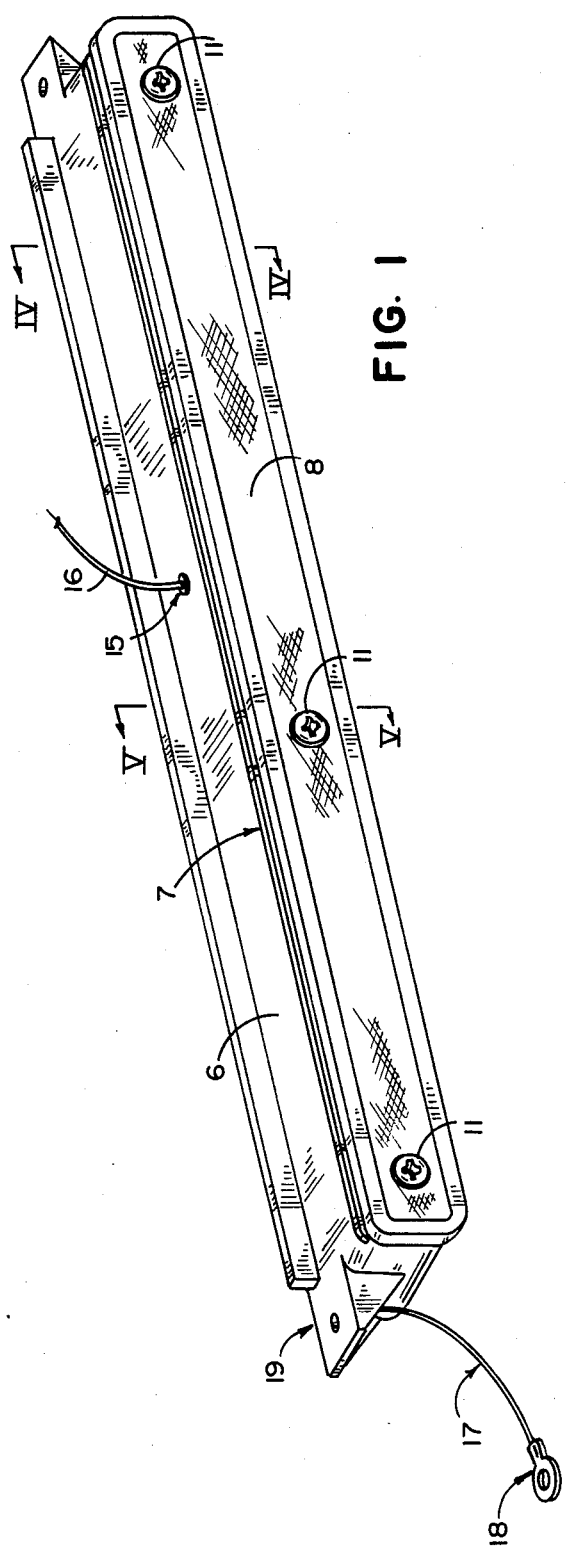
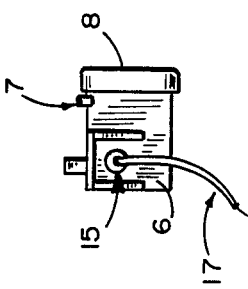

RUNNING BOARD LIGHT ASSEMBLY

This invention relates to improvements in running board lights adapted, though not exclusively, for use on automotive (i.e. Cargo Van Conversion) vehicles.

Vehicle running boards customarily provide a convenient assist to the entry and exit of the vehicle. These running boards typically extend from the rear of the front wheel well to the front of the rear wheel well.

Because of the extent of this expanse, running board manufacturers have made various attempts to enhance the appearance of these boards. A typical approach to this problem is to provide several openings midway along the length, and through the lower-most vertical profile of the running board. Directly behind these openings (and directly beneath the actual stepping surface of the running board) is attached any of several lighting products. When activated by a switch, these lights provide a definite asthetic enhancement to the running board as well as an added safety feature in the form of a side marker light.

The primary problem with this add-on light approach is that no suitable lighting product exists which provides adequate protection from adverse weather effects (i.e. water infiltration) yet still allows a means of lamp replacement when required.

With the foregoing in mind, a new and different running board light is contemplated which incorporates a uniquely designed snap on lens that locks to the body of the assembly. This lens is further secured to the body by (3) screws which pass thru the lens and self-thread into posts which are an intregal part of the body.

Also contemplated is a gasket system which, being placed between the snap on lens and the assembly body, prevents infiltration of moisture past the several mating surfaces of the lens and body.

Further contemplated is the use of water-tight grommets located at two (2) places on the body of the assembly which permit the passage of lead wires out of the assembly while preventing moisture infiltration through these passages.

Another object is the provision of a flange, intregal to the body, located on the top surface of the body directly to the rear of the lens/body juncture which serves to channel accumulated water away from this juncture.

A further object is the use of (3) specially designed snap in lamp sockets which, having the lamp installed, forms a watertight seal around the lamp, providing redundant protection from moisture infiltration which, at this spot in the assembly, could cause a short-circuiting of the socket if not so protected.

The foregoing and other objects and advantages of this invention will become apparent from the following description and from the accompanying drawings in which:

FIG. 1 Is a perspective view of a running board light assembly depicting the location and orientation of the several external components of the assembly;

FIG. 2 Is an end view of the FIG.1 assembly showing locations and orientation of additional components;

Figure 3:
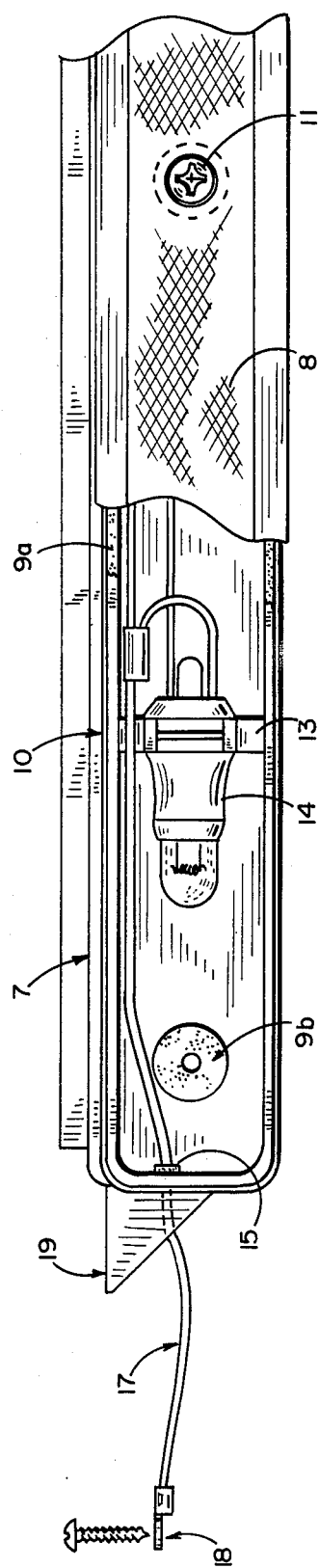
FIG. 3 Is a close-up cutaway view of the FIG.1 running board light assembly depicting the location of the several internal components of the assembly.

Refering, first to FIGS. 1 and 2, the running board light assembly incorporating the principals of the invention is generally denoted by the numeral 1 and is shown in FIG. 1, oriented as it would be when installed in the proper location on the underside of the running board. The running board light assembly 1 includes a main body 6 which is formed of any one of several Polyethylene compounds. The body 6 incorporates an integral drip rail 7 which serves to channel away any water which will accumulate along the top surface of the body 6. The running board light assembly 1 further incorporates a lens 8 which is formed of Polycarbonate material that may be tinted any number of colors, and which possesses a transluscent quality sufficient to allow the passage of light. The interior surface of lens 8 is formed into a diamond shaped pattern which diffuses the light eminating from lamp/socket 14 as it passes through lens 8. This lens 8 is partially secured to the body 6 by means of self threading plated screws 11.

An additional feature is presence of two (2) holes through the body 6 which permits the passage of hookup wires 16 and 17. These holes are then protected from moisture infiltration by snap in rubber grommets 15 whose inside diameter is sufficiently undersized as to form a watertight seal around wires 16 and 17.

Refering next to FIG. 3, the cutaway portion reveals an anchoring ridge 10 over which lens 8 snaps by capturing the ridge within an internal anchoring channel 10a of the lens, further securing lens 8 to body 6. FIG. 3 also exposes gasket system 9A and 9B. Gasket 9A functions as a water tight seal between body 6 and lens 8, while gasket 9B serves a similar function at the openings in lens 8 where screws 11 pass through. Another feature visible in FIG. 3 is the interior portion of grommet 15 showing the passage of wire 17 through the body 6. The grommet 15 shown in FIG. 1 and in conjunction with wire 16, functions in a like manner. FIG. 3 also shows the location of one of several water tight lamp/socket assemblies 14.

This socket 14 mounts to the interior of body 6 by means of a snap fit into mounting bracket 13 which is an intregal part of body 6. Also shown is ring terminal 18 attached to wire 17 through which passes the running board light assembly mounting screw. This screw is then passed through mounting flange 20 and screwed into the underside of the running board effectively producing an electrical ground.

Figure 5:
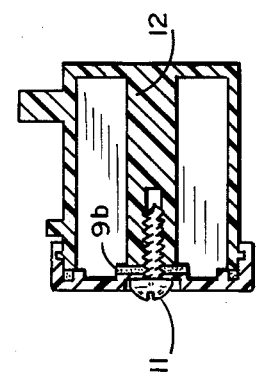
FIG. 5 Is a sectional view of the running board light assembly taken along line 5—5 in FIG. 1.
Figure 4:
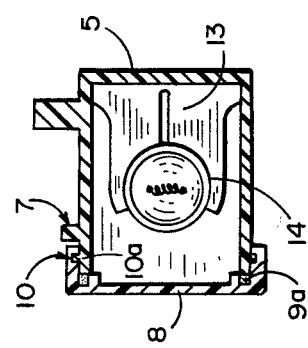
FIG. 4 Is a sectional view of the running board light assembly taken along line 4—4 in FIG. 1.

FIG. 4 and FIG. 5 are sectional views of the running board light assembly 1 which further clarify the foregoing descriptions. FIG. 5 details the screw boss 12 into which screw 11 anchors after passing through lens 8 and gasket 9B respectively.

FIG. 14 Is a side view of lamp/socket 14 and is presented to enhance the understanding of how lamp/socket 14 functions, both in sealing the lamp from moisture infiltration and in how it fits into mounting bracket 13.

From the foregoing it will be appreciated that because of the construction of the running board light assembly the running board manufacturer can be assured of a functional light assembly which will be free of the effects of adverse weather conditions and their inherent warranty problems while still providing the end user with a simple means of lamp replacement when it becomes necessary to do so. By simply removing the screws and lens, the wedge based lamp can be removed from the socket and a new lamp reinstalled into the socket.

What is claimed is:

1. A watertight lighting system for an automotive running board comprising:
   a closed body having a peripheral wall defining an interior of said body, edge means defining an opening through said wall to said interior, an anchoring ridge substantially surrounding said opening and a plurality of anchoring posts positioned within said opening;
   a lamp socket in said body interior, said socket including a body molded of a flexible compound and electrical contacts with integral insulated lead wires;
   said contacts and their lead wires being integrally molded into the socket compound in order to form a watertight seal between the socket body and the lead wire insulation;
   said socket body including a collar having means defining a lamp-receiving opening therein, said collar configured to extend past the contact end of a lamp installed in said socket and said opening having a diameter configured to form a tight fit with the lamp around the circumference of the lamp so as to render the lamp/socket juncture watertight;
   a lens removably covering said opening and having edge means defining anchoring means extending substantially the perimeter of said lens engaging said anchoring ridge for snap-fit retention of said lens to said body;
   sealing means between said lens and said body for sealing the interface therebetween; and
   fastening means passing through openings in said lens and received in said anchoring posts for fastening said lens to said body, whereby, said lighting system, when assembled, provides a weathertight assembly which allows removal of the lens for easy replacement of a lamp mounted in said lamp socket.

2. A watertight lighting system for an automotive running board comprising:
   a closed body having a peripheral wall defining an interior of said body, edge means defining an opening through said wall to said interior, an anchoring ridge substantially surrounding said opening and a plurality of anchoring posts positioned within said opening;
   a lamp socket in said body interior;
   a lens removably covering said opening and having edge means defining anchoring means extending substantially the perimeter of said lens engaging said anchoring ridge for snap-fit retention of said lens to said body;
   a drip rail extending from an upper portion of said peripheral wall and located immediately behind the juncture between said body and said lens, said drip rail extending along the entire top surface of the body peripheral wall and above said juncture for the purpose of channeling away accumulated moisture or the like from said lens/body juncture;
   sealing means between said lens and said body for sealing the interface therebetween; and
   fastening means passing through openings in said lens and received in said anchoring posts for fastening said lens to said body, whereby, said lighting system, when assembled, provides a weathertight assembly which allows removal of the lens for easy replacement of a lamp mounted in said lamp socket.

3. A watertight lighting system for an automotive running board as described in claim 2 in which said sealing means includes means defining an internal channel molded into the portion of said lens adjacent said anchoring means and a gasket positioned within said channel facilitating proper alignment of said gasket with the perimeter of said opening in said body to which the lens is assembled; said sealing means further including a plurality of second gaskets, each of said second gaskets positioned between the outermost face of one of said anchor posts and said lens in a manner that said second gasket completely surrounds the inner surface of the portion of said lens adjacent the respective one of said openings in said lens and, said second gasket having means defining a center hole of sufficient undersized diameter as to cause a tight fit around the mean outside diameter of the anchoring screw.

4. A watertight lighting system for an automotive running board as described in claim 3 wherein said socket includes a body molded of a flexible compound and electrical contacts with integral insulated lead wires; said contacts and their lead wires being integrally molded into the socket compound in order to form a watertight seal between the socket body and the lead wire insulation; and further wherein said socket body includes a collar having means defining a lamp-receiving opening therein, said collar configured to extend past the contact end of a lamp installed in said socket and said opening having a diameter configured to form a tight fit with the lamp around the circumference of the lamp so as to render the lamp/socket juncture watertight.

5. A watertight lighting system for an automotive running board as described in claim 4 in which said anchoring means comprises means defining an internal channel located on the inner surface of that portion of the lens which overlaps said body edge means and which extends completely around the perimeter of said lens, said anchoring channel configured to engage said anchoring ridge upon installation of the lens to the body which, along with the fastening means, maintains uniform compression on the gaskets located between said lens and body.

6. A watertight lighting system for an automotive running board comprising:
   a closed body having a peripheral wall defining an opening through said wall to said interior, an anchoring ridge substantially surrounding said opening and a plurality of anchoring posts positioned within said opening;
   a lamp socket in said body interior;
   a lens removably covering said opening and having edge means defining anchoring means extending substantially the perimeter of said lens engaging said anchoring ridge for snap-fit retention of said lens to said body;
   sealing means between said lens and said body for sealing the interface therebetween; said sealing means including means defining an internal channel molded into a portion of said lens adjacent said anchoring means and a gasket positioned within said channel facilitating proper alignment of said gasket with the perimeter of said opening in said body to which the lens is assembled;
   said sealing means further including a plurality of second gaskets, each of said second gaskets positioned between the outermost face of one of said anchor posts and said lens in a manner that said second gasket completely surrounds the inner surface of the portion of said lens adjacent the respective one of said openings in said lens and, said second gasket having means defining a center hole of sufficient undersized diameter as to cause a tight fit around the means outside diameter of the anchoring screw; and fastening means passing through openings in said lens and received in said anchoring posts for fastening said lens to said body, whereby, said lighting system, when assembled, provides a weathertight assembly which allows 7. A watertight lighting system for an automotive running board as described in claim 6 in which said anchoring means comprises means defining an internal anchoring channel located on the inner surface of that portion of the lens which overlaps said body edge means and which extends completely around the perimeter of said lens, said anchoring channel configured to engage said anchoring ridge upon installation of the lens to the body which, along with the fastening means, maintains uniform compression on the gaskets located between said lens and body.

8. A watertight lighting system for an automotive running board comprising:

a closed body having a peripheral wall defining an interior of said body, edge means defining an opening through said wall to said interior, an anchoring ridge substantially surrounding said opening and a plurality of anchoring posts positioned within said opening;

a lamp socket in said body interior;

a lens removably covering said opening and having edge means defining anchoring means extending substantially the perimeter of said lens engaging said anchoring ridge for snap-fit retention of said lens to said body;

said anchoring means comprises means defining an internal anchoring channel located on the inner surface of that portion of the lens which overlaps said body edge means and which extends completely around the perimeter of said lens, said anchoring channel configured to engage said anchoring ridge upon installation of the lens to the body which, along with the fastening means, maintains uniform compression on to gasket located between said lens and body;

sealing means between said lens and said body for sealing the interface therebetween; and fastening means passing through openings in said lens and received in said anchoring posts for fastening said lens to said body, whereby, said lighting system, when assembled, provides a weathertight assembly which allows removal of the lens for easy replacement of a lamp mounted in said lamp socket.

* * * * *

UNITED STATES PATENT AND TRADEMARK OFFICE
CERTIFICATE OF CORRECTION

PATENT NO. : 4,819,136

DATED : April 4, 1989

INVENTOR(S) : Edward Ramsey

It is certified that error appears in the above-identified patent and that said Letters Patent is hereby corrected as shown below:    Title page:

Abstract, line 2:

Delete "desinged" and insert --designed--.

Column 1, line 32:

After "body by" insert --three--.

Column 1, line 43:

Delete "intregal" and insert --integral--.

Column 1, line 47:

After "use of" insert --three--.

Column 2, line 4:

Delete "Refering" and insert --Referring--.

Column 2, line 29:

Delete "Refering" and insert --Referring--.

Column 2, line 23:

After "is" insert --the--.

Column 2, line 27:

Delete "sufficintly" and insert --sufficiently--.

Column 2, line 33:

Delete "system" and insert --systems--.

Column 2, line 34:

Delete "water tight" and insert --watertight--.

UNITED STATES PATENT AND TRADEMARK OFFICE
CERTIFICATE OF CORRECTION

PATENT NO. : 4,819,136

DATED : April 4, 1989

INVENTOR(S) : Edward Ramsey

It is certified that error appears in the above-identified patent and that said Letters Patent is hereby corrected as shown below:

Column 2, line 41:

Delete "water tight" and insert --watertight--.

Column 2, line 45:

Delete "intregal" and insert --integral--.

Figure 6:
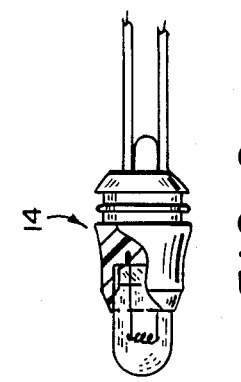
FIG. 6 Is a seperate view of the water tight rubberized lamp socket as seen in FIG. 3, having the numerical designation of numeral 14.

Column 2, line 56:

Delete "Fig. 14" and insert --Fig. 6--.

Column 5, line 14:

After "allows" insert --removal of the lens for easy replacement of a lamp mounted in said lamp socket--.

Column 5, line 18:

Delete "anchoring".

Signed and Sealed this

Tenth Day of July, 1990

*Attest:*

HARRY F. MANBECK, JR.

*Attesting Officer*      *Commissioner of Patents and Trademarks*